July 9, 1963 G. L. HOBROUGH ET AL 3,097,355
APPARATUS FOR AERIAL SURVEY RADAR DISTANCE MEASUREMENT
Filed March 6, 1957 3 Sheets-Sheet 1

Inventors
GILBERT L. HOBROUGH
FRED M. HANNA
by: *J. Richard Cavanaugh*
Patent Agent July 9, 1963  G. L. HOBROUGH ET AL  3,097,355
APPARATUS FOR AERIAL SURVEY RADAR DISTANCE MEASUREMENT
Filed March 6, 1957  3 Sheets-Sheet 2

Inventors
GILBERT L. HOBROUGH
FRED M. HANNA by: J. Richard Cavanagh
Patent Agent July 9, 1963   G. L. HOBROUGH ET AL   3,097,355
APPARATUS FOR AERIAL SURVEY RADAR DISTANCE MEASUREMENT
Filed March 6, 1957   3 Sheets-Sheet 3

Inventors
GILBERT L. HOBROUGH
FRED M. HANNA
by: *J. Richard Cavanaugh*
Patent Agent.

United States Patent Office 3,097,355
Patented July 9, 1963

3,097,355
APPARATUS FOR AERIAL SURVEY RADAR
DISTANCE MEASUREMENT
Gilbert Louis Hobrough, Oshawa, Ontario, and Fred Manley Hanna, Toronto, Ontario, Canada, assignors, by mesne assignments, to Hunting Survey Corporation Limited, Toronto, Ontario, Canada
Filed Mar. 6, 1957, Ser. No. 644,366
3 Claims. (Cl. 343—7.3)

This invention relates to a novel apparatus for aerial survey radar distance measurement particularly adapted for establishing the clearance height of a survey aircraft above the surface of the terrain being surveyed.

According to the invention, an improved centre reference radar pulse system is employed wherein simplified and novel circuitry may be taken advantage of to effect substantial savings in weight and wherein inaccuracies arising out of inherent characteristics of recording devices may be compensated for whereby a high precision clearance height measurement may be made in aerial survey work.

Having regard to the foregoing, it is another object of the invention to provide an apparatus for discriminating the reference time of echo pulses of the centre reference type against reference pulses having a centre reference timing which is a function of the recorded clearance height whereby an error signal is obtained from the discriminator to continuously correct the recorder to indicate the actual echo distance.

It is another object of the invention to provide the combination in a centre reference pulse radar system of a coincidence discriminator rendered responsive to an error in recorded distance as compared with echo distance to provide a driving error signal for a pen recorder having associated therewith a variable potential source useable as a control voltage adapted to adjust the timing of a reference signal against which the echo signal is discriminated to provide a precise response of the pen recorder to a pen recorder error.

Other objects of the invention will be appreciated by a study of the following specification taken in conjunction with the accompanying drawings.

Figure 1:
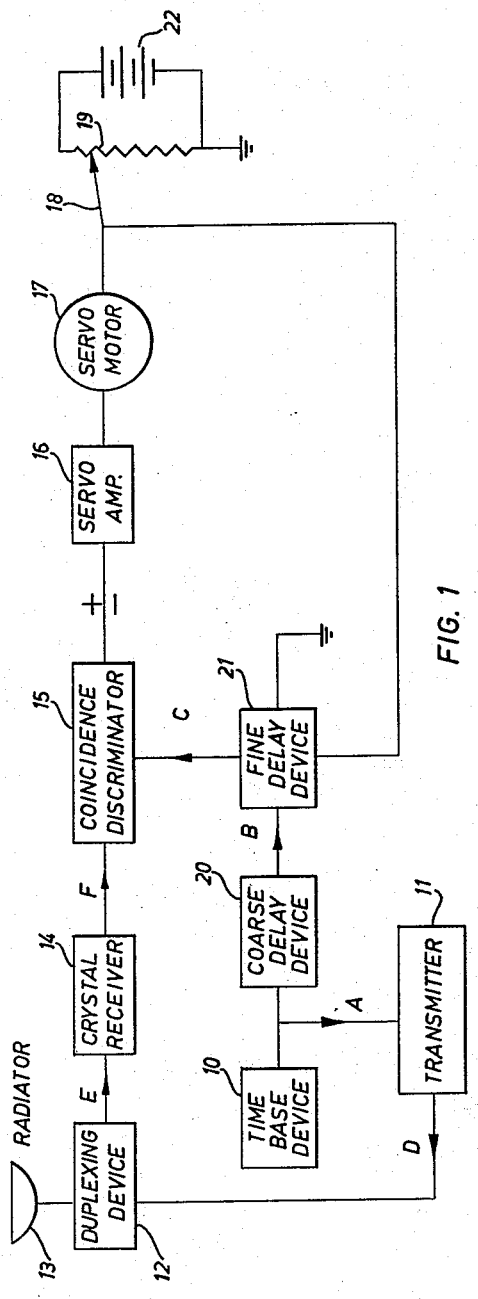
FIGURE 1 is a simplified block diagram of a radar system for aerial survey purposes according to the invention.
Figure 2:
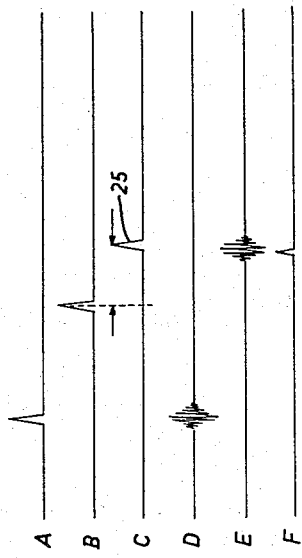
FIGURE 2 represents the relative location of the pulses in point of time at the various points in the system of FIGURE 1 designated by corresponding letters A to F.

Referring to the drawings and particularly FIGURE 1, a time base device 10 is provided in any suitable conventional form to produce short powerful pulses in rapid sequence, of a centre reference pulse form, as shown at A in FIGURE 2. Preferably, the pulse form is of substantially gaussian wave form and generally constituting in its shape, a mirror image about a vertical centre reference line extended through the apex of the amplitude thereof. Regardless of the specific nature of centre reference pulses employed, the same are utilized to modulate a suitable radar carrier frequency delivered from a transmitter 11 which may be of conventional circuitry to provide a pulse at D (see FIGURE 2) communicated by conventional duplexing device 12 to the radar antenna 13 preferably arranged to direct the pulses of radiated energy toward a terrain surface effectively at right angles thereto.

Pulse energy is reflected from the terrain surfaces in the form of substantially corresponding echo pulses received by the radiator at a lag time represented on the time base of FIGURE 2 at E which is a function of the distance of the radiator from the surface of the terrain. The receiver 14 according to this invention is preferably of the crystal video type whereby an effective weight saving may be accomplished. The demodulated echo signals as represented at F, define an echo time delay as compared with the pulses at A. While range measurement devices may contemplate the direct measurement of such quantity, the system of the invention is concerned only with echo distance error as compared with recorded distance measurement.

The coincidence discriminator 15 forming an element of this invention and described hereinafter in more detail, effectively discriminates the time reference line of the received echo pulse against the time reference line of a reference pulse in such manner that should the pulses be coincident in time, the direct current output of the discriminator will be zero and the conventional direct current servo amplifier 16 driving the conventional servo motor 17, which latter is adapted to move a pen which may be assumed to be a part of a mechanically linked slider 18 of potentiometer 19 does not change the position of the latter. A reference signal from the time base devices 10 is passed through a conventional delay network identified as a coarse delay device 20 to obtain a delayed reference signal pulse B shown in FIGURE 2. One or more coarse delay devices may be employed, all of which may be of conventional construction and function and each of which may introduce a delay in the reference signal obtained from the time base device 10 corresponding to a different elevation. Thus, the timing of the pulse shown at B in FIGURE 2 may correspond to the delay of an echo pulse at five thousand feet. The fine delay device 21 of the invention therefore is utilized above a selected reference elevation or beyond a reference delay in such manner that it adjusts the delay of the reference signal responsive to a biasing or control potential from resistor 19 disposed across the battery or other electrical potential source 22 whereby a correct positioning of slider 18 and thus the pen of a recorder associated therewith will cause a control potential to be applied to the fine delay device 21 producing a reference signal therefrom as indicated in the differentiated form at C coincident in its time reference line with the time reference line of the received echo pulse at F. Under these conditions, the output of the coincidence discriminator will be zero.

If, however, a subsequent pulse at F is at a later or earlier centre reference point in time than the pulses at C, then the output of the coincidence discriminator will be positive or negative responsive to a positive or negative time error effecting a driving of the slider or pen 18 to a new position until the control potential from resistor 19 effects an adjustment of the reference signal timing providing coincidence and zero signal output from the discriminator.

Figure 3:
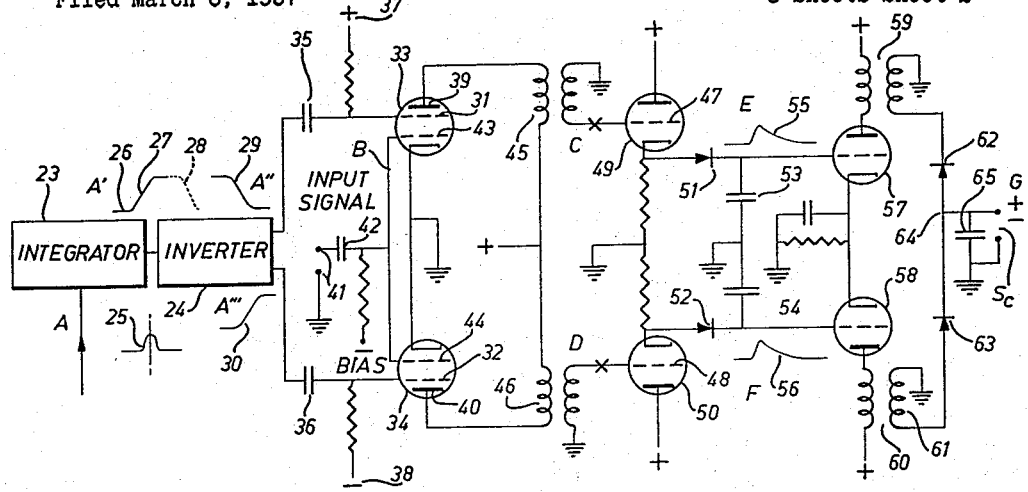
FIGURE 3 is an electronic schematic of one suitable form of coincidence discriminator according to the invention and represented in the block diagram of FIGURE 1.
Figure 4:
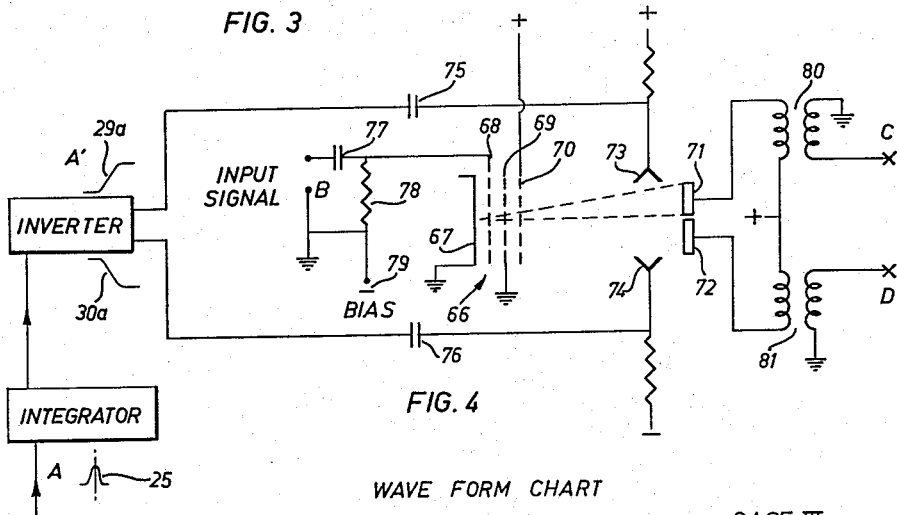
FIGURE 4 is an electronic circuit diagram of a modified form of coincidence discriminator wherein it will be understood that the devices of this figure may be substituted for the devices of FIGURE 3 to the left of the "X" marks therein.
Figure 5:
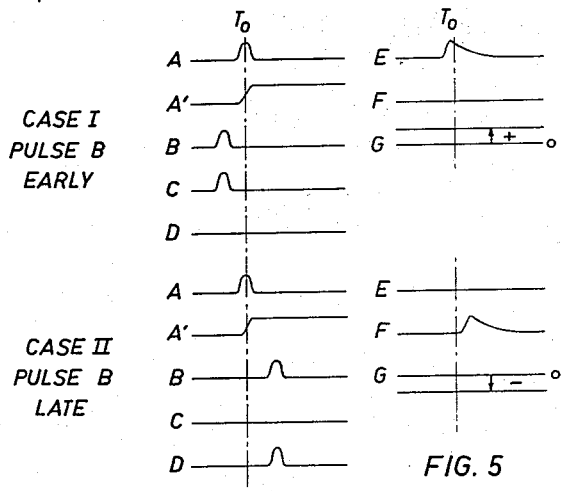
FIGURE 5 is a wave form chart for the circuits of FIGURES 3 and 4.
Figure 6:
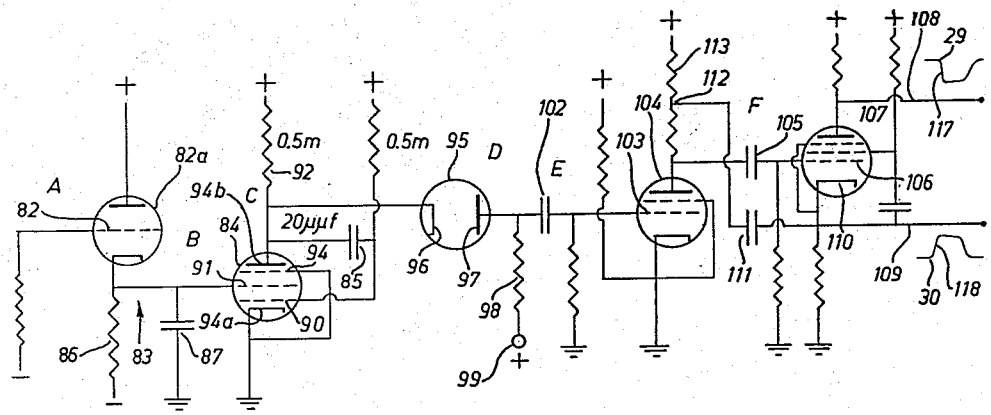
FIGURE 6 is an electronic schematic of a variable delay integrator according to the invention having a wave shaping and inverting output section, all of which is embraced by the block diagram designated as a fine delay device in FIGURE 1.
Figure 7:
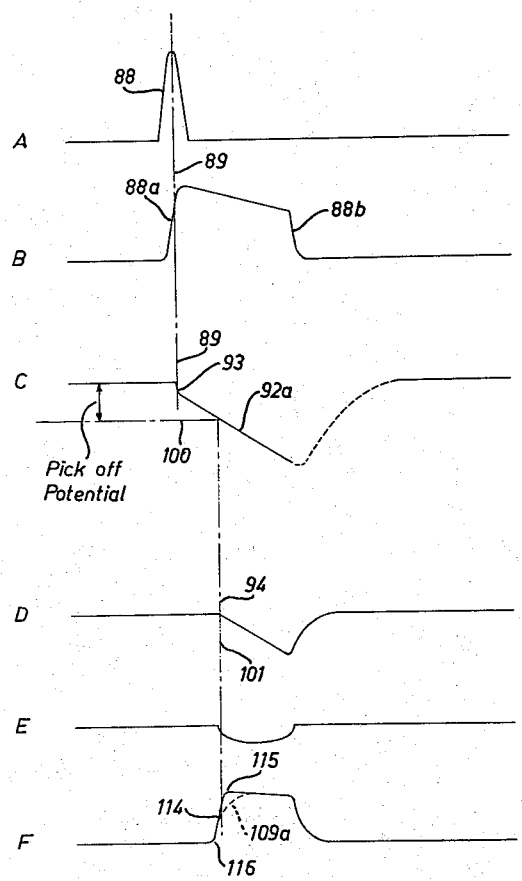
FIGURE 7 illustrates wave forms at points A to F of FIGURE 6.

The discriminator 15 is shown in more detail in FIGURES 3 to 5 in which the integrator 23 and inverter 24 are constituted by the fine delay device 21 shown in block diagram form in FIGURE 1 and in schematic form in FIGURES 6 and 7. One form of discriminator according to the invention which is adapted to provide a direct current signal $S_c$ for driving the servo amplifier 16 responsive to a time difference between the echo signal at F and the reference signal at C from the fine delay device is shown in FIGURE 3. The reference signal 25 is shown being processed by the integrator 23 to obtain an S-shaped wave form 26 having a steep substantially sloped line 27 in which the mid point thereof represents the reference line or peak of the reference signal 25 at a reference time indicated hereinafter as $T_0$. As indicated by the dotted line portion 28, the integrated signal wave form decays to zero before arrival of a following pulse, as will be evident in a consideration of FIGURE 7F hereinafter. The inverter may be of conventional form to provide opposite integrated reference signals 29 and 30. A special form of inverter of the invention is disclosed hereinafter in FIGURE 6.

The inverter 24 provides opposed screen grid reference control signals 29 and 30 coupled to the screen grids 31 and 32 of the amplifying tetrodes 33 and 34 by the coupling condensers 35 and 36 respectively.

The screen grid of the tetrode tube 33 is biased positively by a suitable source (not shown) as indicated by the positive sign 37 whereas the screen grid of the tube 34 is biased negatively as indicated by the sign 38. In operation, therefore, the signals 29 and 30 to a greater or lesser degree suppress electron emission to the plates 39 and 40 responsive to the signals 29 and 30 in such manner that the screen grid 32 being negatively biased in the first instance, renders the tube 34 initially non-conducting whereas tube 33 is conducting at a predetermined maximum. Upon entry of signals 29 and 30, screen grid 31 becomes more negative to a limiting substantially non-conducting value and screen grid 32 becomes proportionally more positive toward the maximum conducting condition. Both tubes are adjusted by means of the biasing 37 and conduct substantially equally when the signals 29 and 30 arrive on their screen grids at the instant $T_0$ at which each of the signals 29 and 30 are at one-half their maximum amplitudes.

An input signal applied to the terminals indicated at 41 through conventional coupling condenser 42 and conventionally biased control grids 43 and 44, is amplified substantially selectively to a greater or lesser degree by the tubes 33 or 34 responsive to the instantaneous value of the signals 29 and 30 on the screen grids 31 and 32. Thus, if, at a given time instant $T_0$ both tubes 33 and 34 are equally conducting corresponding to the instant in time of the mid point of the steep slope portion of signals 29 and 30 and if the peak point or centre reference line of the input signal arrived at the same instant $T_0$, the output of each of the tubes 33 and 34 will be the same. If, however, the input signal arrives slightly in advance of the reference time $T_0$ in the screen control signals 29 and 30, the tube 33 will be at that moment capable of developing a greater output signal than the tube 34 since its screen grid will be more positive than screen grid of tube 34. On the other hand, if the input signal is late as compared to the reference time $T_0$, the tube 34 will be in a condition developing a greater output signal than the tube 33 because its screen grid will be at a greater positive potential than the screen grid of the tube 33.

Since the pulses of the greater or lesser magnitude obtained from the plate circuits of the tubes 33 and 34 will be generally of very short duration, the immediate rectification thereof to obtain a direct current signal responsive to delay error, is undesirable in view of the short duty ratio available and the heavy current circuitry which would necessarily be involved in any output rectifying processing thereof. Accordingly, the pulse shaping and rectifying circuit portion of the discriminating system shown in FIGURE 3 is generally indicated to the right of the diagram beyond "X" marks therein to designate a portion of the circuitry beyond the essential discriminating function and which provides for a stretching of the pulses before rectification to enable amplification and rectification by conventional components.

Transformers 45 and 46 complete the plate circuits of the delay differential amplifier tubes 33 and 34 and provide positive going signal pulses through secondaries to the grids 47 and 48 of the triodes 49 and 50 disposed in cathode follower connection providing a suitable low impedance match to the rectifying devices or diodes 51 and 52. In operation, a pulse appearing on one of the diodes progresses up to its maximum value and then the corresponding by-pass condenser 53 or 54 respectively controls the decay time from the peak value of potential on the wave form over a stretched time base as indicated by the wave form configurations 55 and 56. The triode power amplifier tubes 57 and 58 are energized on their grids by the stretched signal pulses 55 and 56 and deliver their output to the corresponding plate transformers 59 and 60. It is to be noted that the secondary winding 61 of the plate transformer 60 is connected in reverse manner as compared with the secondary of the transformer 59 to the rectifying devices 62 and 63 connected in series therebetween. By this means, a direct current output may be obtained from the point 64 between the rectifying devices 62 and 63 and ground which will have a predetermined value for equal power output signals from the tubes 57 and 58 and will move to a higher or lesser value for advance or delay input signals respectively at the terminal 41. A suitable by-pass condenser 65 removes unwanted components from the signal $S_c$ thus obtained.

A modified form of pulse delay discriminating device is shown in FIGURE 4 and corresponds in function to that part of the schematic of FIGURE 3 to the left of "X" marks therein, it being understood that the device of FIGURE 4 may be substituted for the said left-hand portion of the diagram of FIGURE 3. In the device of FIGURE 4, a so-called "sheet beam tube" is employed. The tube has an electron beam movable under the influence of a shiftable electrostatic field selectably over two target anodes and is used herein for discriminating the delay of input signal against the reference time point $T_0$ of the inverted reference signals 29a and 30a. While any known form of dual target electrostatic deflection type tube may be employed, it is preferred to use a tube construction obtainable commercially under the accepted North American designation 6AR8. In any case, the sheet beam tube used comprises a gun structure 66 having a cathode 67 emitting an electron beam through a control grid 68, focusing electrode 69 and accelerating electrode 70 toward the target anodes 71 and 72. Electrostatic deflecting plates 73 and 74 are charged by exterior sources (not shown), the one positive and the other negative, to cause the electron beam to be deflected normally toward the target anode 71 as indicated by chain lines. The signals 29a and 30a are applied to the deflecting plates 73 and 74 through coupling condensers 75 and 76 to cause the electron beam to strike the anodes 71 and 72 equally at the point $T_0$ in time at which the deflecting plate potentials are equal. The electron beam will continue to swing as the charge of the deflection plates changes under influence of reference signals 29a and 30a until it strikes the anode 72 at which point the deflecting plate 74 is positive and the deflecting plate 73 is negative. Accordingly, the electron beam is adapted to swing or sweep back and forth over the target anodes 71 and 72 in accordance with the reference or sweep signals 29a and 30a.

The input signal obtained from the receiver 14 of FIGURE 1 is coupled through the condenser 77 and resistor 78 to the control electrode or grid 68. Biasing at 79 normally biases the control electrode to cut-off, thereby preventing the progress of the electron stream from the cathode 67 to the target anodes 71 and 72. Therefore, the input signal permits the flow of electrons toward the target anodes in such distribution thereover as will be determined by the potentials on the deflection plates 73 and 74, governed by the sweep signals 29a and 30a. Thus, if the peak value of the input signal is coincident in time with the point $T_0$ on the reference wave forms 29a and 30a, the electron stream will strike target anodes 71 and 72 equally and the resulting opposed anode or plate circuits including transformers 80 and 81 coupled to the pulse stretching and rectifying circuit of FIGURE 3 will deliver a predetermined direct current output $S_0$. On the other hand, if the input signal leads the time point $T_0$ the electron beam will strike the anode 71 at the peak value of the input signal and the resulting direct current output $S_0$ will be more negative than the said predetermined value. Furthermore, if the input signal lags the reference time $T_0$, the electron beam will strike the target 72 and the resulting direct current output $S_0$ will be more positive than the predetermined value.

In FIGURE 5, a wave form chart is set forth for cases I, II, and III shown, in which pulse B is early, pulse B is late and pulse B is coincident with pulse A, respectively. The pulses are shown at the points A, A', B, C, D, E, F and G in FIGURES 3 and 4.

The fine delay device 21 provides a reference signal, a differentiated form of which is shown at 25 in FIGURES 2 and 3. The actual reference signal obtained from the fine delay device is in the form of the opposed wave form reference signals 29 and 30 shown at C in FIGURE 1 and in FIGURE 3 wherein they constitute the reference pulses for the coincidence discriminator. For purposes of clarity, the same pulses 29 and 30 are shown at the right hand or output end of the inverter section of FIGURE 6.

At the left hand or input end of the schematic of FIGURE 6 embodying an adjustable delay integrator portion of the circuit, an input signal is obtained from the coarse delay device 20 of FIGURE 1. The form and relative time reference of such signal is shown at A in FIGURES 6 and 7. This precisely timed reference pulse is applied positively to the grid 82 of the switching triode 82a utilized in cathode follower output connection 83 for direct coupling of the output thereof to the modified Miller integrating circuit sharp cut-off pentode tube 84. By reason of the novel modification of this circuit as represented by this diagram, typical values of load resistance and plate-to-grid coupling condenser 85 are shown.

For the values shown, a tube obtainable under the accepted North American designation 6AU6 is employed for tube 84. Cathode resistor 86 of triode 82a controls the operating point of the tube and serves as an output load resistance for the signal output. The output signal, however, is of stretched form by reason of charging condenser 87 through the resistance of the tube 82a. The wave form 88 retains its leading edge contour 88a but is stretched on its trailing edge by condenser 87 to provide a trigger pulse of practical width for tube 84. Just prior to the time reference line 89 of triggering pulse at B and reference pulse 88, the plate current of pentode 84 is zero and hence the output voltage is a maximum. The control grid voltage is approximately zero although very slightly positive by virtue of the grid 90 being connected to positive voltage through a 0.5 megohm resistor. The entry of the leading edge 88a of triggering pulse 7B on screen grid 91 initiates electron flow effectively causing an initial drop in output voltage across resistor 92 as indicated by step 93 in the output wave form 7C. This is accompanied by a simultaneous drop in control grid voltage since the plate and grid are coupled by capacitance 85. The tube is then in an amplifying condition during which the output voltage falls linearly with time as at 92a to a value at which the plate voltage of tube 84 drops to a value so that a virtual cathode forms between the suppressor grid 94 tied to cathode 94a and anode 94b. At this point the tube ceases to amplify and control grid 90 goes positive increasing electron flow through the tube by way of screen grid 91 causing rapid discharge of condenser 87 producing a terminal sloped portion 88b on wave form 7B. The resulting removal of screen voltage reduces the electron current to essentially zero. The plate voltage then rises as shown in dotted line representation in wave form 7C at a rate determined by the time constant of condenser 85 charging through plate resistor 92.

The signal at 7C is coupled to a diode 95 in series connection through the cathode end 96 thereof and the plate 97 of the diode is charged through a load resistance 98 with a control potential applied to terminal 99. The control potential at 99 results in an effective time delay biasing of acceptance of the diode 95 for passage of the signal C therethrough. At a given control potential on plate 97 of diode 95, the latter is effectively non-conducting until the incoming potential at cathode 96 drops to a precise value below which portions of the wave form C may be passed. In practical effect, therefore, the control voltage at terminal 99 provides a pick-off potential indicated by the line 100 in the wave form C of FIGURE 7, as a result of which the diode 95 delivers a clipped pulse signal beginning at the point 94 as described, being at a later time reference line 101 shown at the wave form D of FIGURE 7. By this means and method, the time reference point of the reference pulse may be controlled. In this connection, the control signal for terminal 99 is obtained from the slider 18 of FIGURE 1. The signal at D passes through the coupling condenser 102 being effectively differentiated thereby as indicated at E in FIGURE 7 and enters the first grid 103 of the amplifier tube 104.

The output of amplifier 104 is coupled through condenser 105 to the first grid 106 of a conventional pentode inverter circuit having a pentode tube 107 providing a dual channel inverter output in the lines 108 and 109. The signal at the condenser 105 would be of the form indicated by the chain line wave form shape 109a shown at F in FIGURE 7, were it not for the feed back loop coupling the cathode 110 through condenser 111 to a feed-back proportioning tap 112 on the plate load resistor 113 of tube 104. By reason of the feed back coupling described, the reference slope portion 114 of the wave form at F is rendered of uniform straight line nature slightly curved at the upper and lower extremities 115 and 116. Thus, the wave forms 29 and 30 embody relatively steep straight line portions 117 and 118, the midpoint of which embodies a precise time reference point adjustable responsive to the control signal from the pen recorder slider as described.

In operation, the limits of excursion of control voltage are determined by the length of the linear portion 92a of curve 7C. The inclusion of a coarse delay device as shown in FIGURE 1 is therefore rendered necessary for practical applications where distance measurements greater than say 5,000 feet may be required. Such measurements may be accomplished say in 1,000 foot steps for each of which a coarse delay device is provided.

While the fine delay device described is preferably of the novel controllable delay integrator type as set forth, the adjustment of pulse timing may be accomplished in another way by taking advantage of a novel characteristic of thyratron operation as set forth in co-pending application Serial No. 625,352 entitled Thyratron Modulator for Short Pulse Radar and the Like. In such instance, however, the signal pulses from a controllable thyratron delay device would have to be integrated and inverted for control of the coincidence discriminator 15 as herein described.

What we claim as our invention is:

1. In a pulse radar range measuring apparatus adapted for survey aircraft use to indicate the clearance height of the aircraft above a terrain surface: a dual channel amplifier adapted to amplify a radar echo pulse signal in each channel thereof; a range indicating device; means providing a control signal proportional to the range indicated by said device; means providing a timing reference signal; means providing at predetermined spacings in time a controlled reference sweep signal responsive to said reference signal and said control signal; means responsive to said controlled reference sweep signal for increasing the amplification of one channel of said amplifier while proportionally decreasing the amplification of the other channel thereof; means normally biasing said channels for equal amplification thereby at a predetermined timing in each controlled reference sweep signal; means providing an error signal responsive to the relative amplification of said echo pulse signal by said amplifier channels and hence responsive to a lack of coincidence of said controlled reference sweep signal and the centre of said echo signal; and means driving said range indicating device responsive to said error signal to change said control signal effecting coincidence of said sweep signal and said echo signal thereby reducing said error signal to zero.

2. In a pulse radar range measuring apparatus adapted for survey aircraft use to indicate the clearance height of the aircraft above a terrain surface: a dual channel amplifier adapted to amplify a radar echo pulse signal in each channel thereof; a range indicating device; means providing a control signal proportional to the range indicated by said device; means including a Miller integrating device providing a timing reference signal; means providing at predetermined spacings in time a controlled reference sweep signal responsive to said reference signal and said control signal; means responsive to said controlled reference sweep signal for increasing the amplification of one channel of said amplifier while proportionally decreasing the amplification of the other channel thereof; means normally biasing said channels for equal amplification thereby at a predetermined timing in each controlled reference sweep signal; means providing an error signal responsive to the relative amplification of said echo pulse signal by said amplifier channels and hence responsive to a lack of coincidence of said controlled reference sweep signal and the centre of said echo signal; and means driving said range indicating device responsive to said error signal to change said control signal effecting coincidence of said sweep signal and said echo signal thereby reducing said error signal to zero.

3. In a pulse radar range measuring apparatus adapted for survey aircraft use to indicate the clearance height of the aircraft above a terrain surface: a dual channel amplifier adapted to amplify a radar echo pulse signal in each channel thereof; a range indicating device; means providing a control signal proportional to the range indicated by said device; means providing a timing reference signal; means responsive to said timing reference signal providing output wave forms having a straight sloped portion, the leading edge of which corresponds in timing to said reference signal; means responsive to said control signal clipping said wave forms providing a new position in time for the effective leading edge thereof; means providing at predetermined spacings in time a controlled reference sweep signal responsive to said clipped wave forms; means responsive to said controlled reference sweep signal for increasing the amplification of one channel of said amplifier while proportionally decreasing the amplification of the other channel thereof; means normally biasing said channels for equal amplification thereby at a predetermined timing in each controlled reference sweep signal; means providing an error signal responsive to the relative amplification of said echo pulse signal by said amplifier channels and hence responsive to a lack of coincidence of said controlled reference sweep signal and the centre of said echo signal; and means driving said range indicating device responsive to said error signal to change said control signal effecting coincidence of said sweep signal and said echo signal thereby reducing said error signal to zero.

References Cited in the file of this patent

UNITED STATES PATENTS

| | | |
|---|---|---|
| 2,508,384 | Gross | May 23, 1950 |
| 2,628,349 | Nightenhelser | Feb. 10, 1953 |
| 2,709,804 | Chance et al. | May 31, 1955 |
| 2,760,189 | McCoy | Aug. 21, 1956 |
| 2,776,427 | Bedford | Jan. 1, 1957 |
| 2,786,995 | Pollard | Mar. 26, 1957 |
| 2,790,167 | Brunn | Apr. 23, 1957 |
| 2,823,375 | Camp | Feb. 11, 1958 |
| 2,912,686 | Dodington | Nov. 10, 1959 |